Jan. 25, 1927.  O. S. JENNINGS  1,615,704
METER TESTING SWITCH MECHANISM
Filed March 23, 1921   3 Sheets-Sheet 1
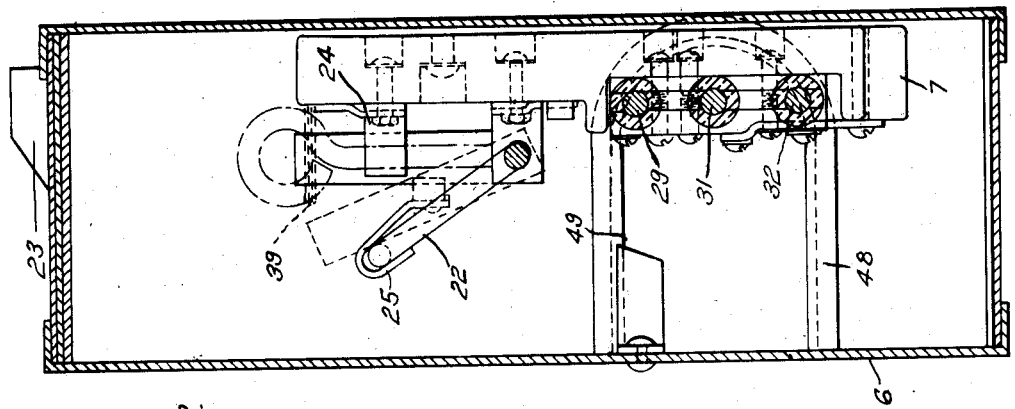
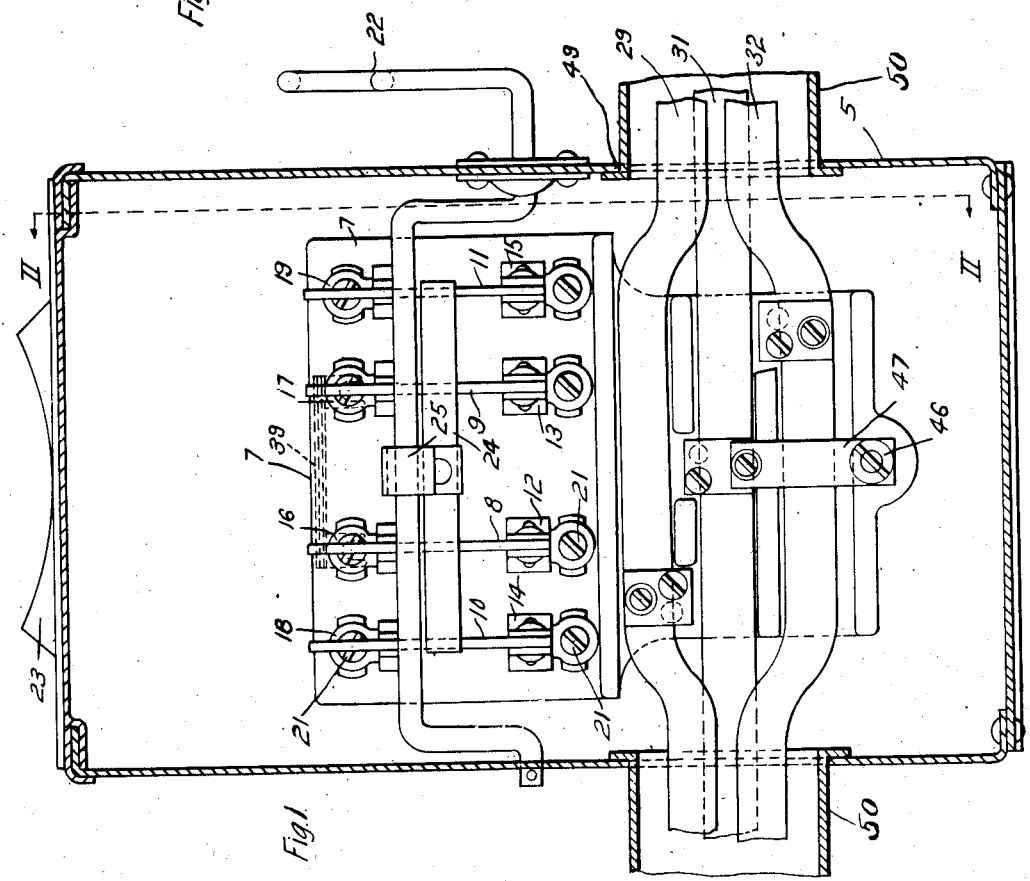
WITNESSES:
INVENTOR
Oliver S. Jennings
BY
Wesley G. Carr
ATTORNEY Jan. 25, 1927. 1,615,704
O. S. JENNINGS
METER TESTING SWITCH MECHANISM
Filed March 23, 1921 3 Sheets-Sheet 2

WITNESSES:

INVENTOR
Oliver S. Jennings.
BY
Wesley G. Carr
ATTORNEY

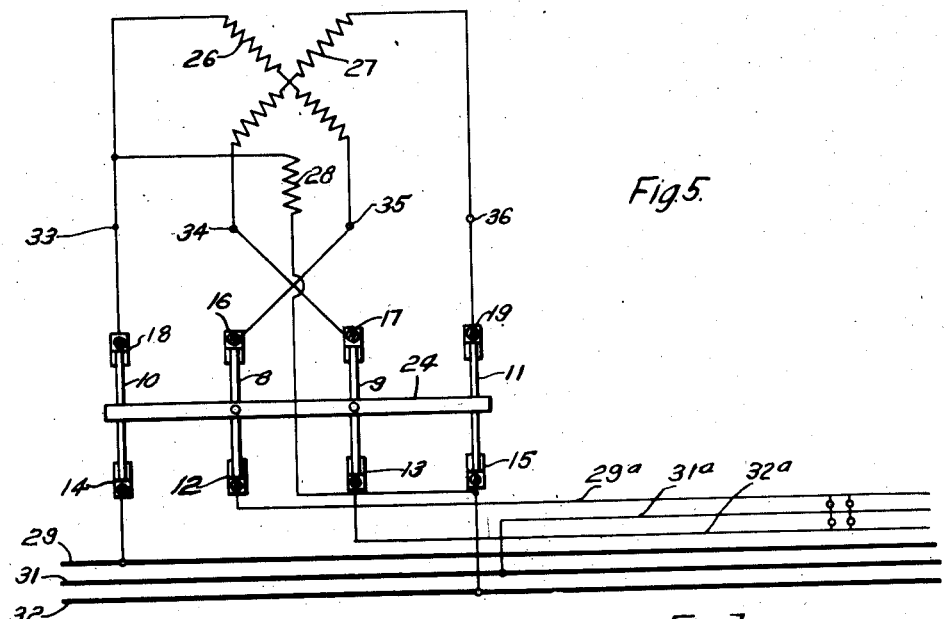
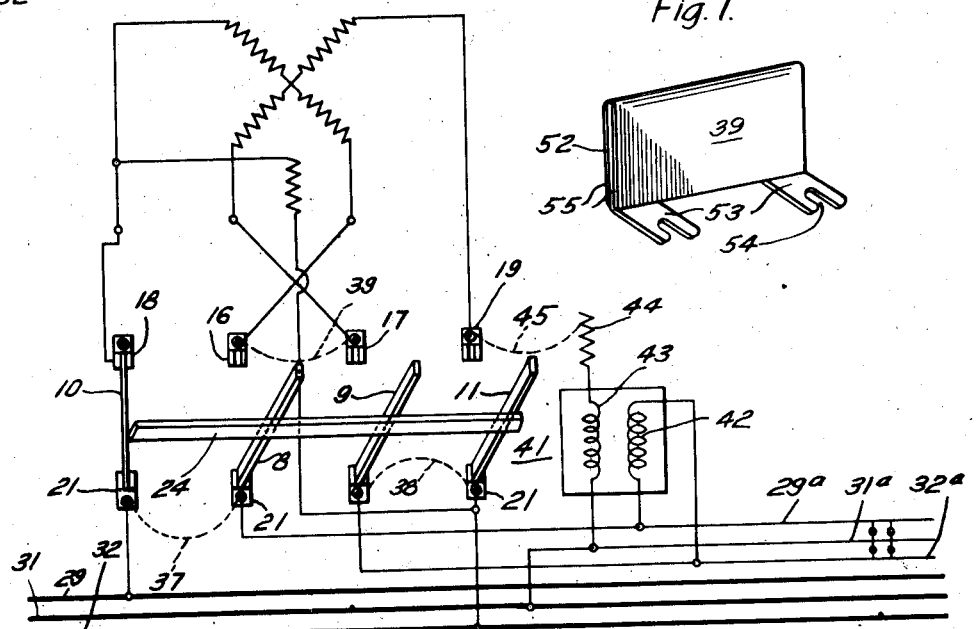

Patented Jan. 25, 1927.

1,615,704

UNITED STATES PATENT OFFICE.

OLIVER S. JENNINGS, OF BROOKLYN, NEW YORK, ASSIGNOR TO WESTINGHOUSE ELECTRIC & MANUFACTURING COMPANY, A CORPORATION OF PENNSYLVANIA.

METER-TESTING-SWITCH MECHANISM.

Application filed March 23, 1921. Serial No. 454,815.

My invention relates to switch mechanism and particularly to meter testing switches.

One object of my invention is to provide a simple switch mechanism, whereby the circuits of a test-meter may readily be connected in proper relation to the circuits of the service meter.

Another object of my invention is to provide a switch mechanism, having the above characteristics, wherein the proper sequence of operation of the various switches thereof is insured.

A further object of my invention is to provide a switch mechanism for the purpose specified that is particularly well adapted for use in installations of batteries of meters where the meters and switch mechanism are arranged in banks or rows.

These and other objects, that will be made apparent throughout the further description of the invention, are attained by means of the switch mechanism herein described and illustrated in the accompanying drawings, wherein:

Figure 1 is a front view of a switch box and the enclosed switch mechanism, the cover being removed;

Fig. 2 is a longitudinal section through the switch box taken on the line II—II of Fig. 1;

Figs. 5 and 6 are diagrams showing the various circuit connections during normal and test operations, respectively; and Fig. 7 is a perspective view of a jumper used in meter testing.

Figure 3:
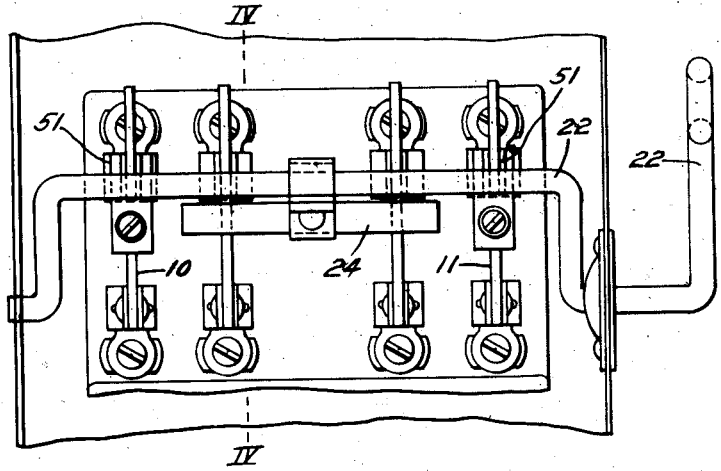
Fig. 3 is a front view of a fragment of a switch box enclosing a modified form of switch mechanism.

Referring to the drawings, the apparatus includes a metal box or housing 5 having a detachable cover 6. An insulating panel or base 7 is attached to the bottom of the box and supports the switch mechanism and bus lines to be hereinafter described.

The switch mechanism includes four switch members 8, 9, 10 and 11 that are arranged side by side upon the base and pivoted to terminal members 12, 13, 14 and 15 respectively. Terminal members 16, 17, 18 and 19 are disposed respectively opposite the terminal members 12, 13, 14 and 15 and receive the free ends of the switch blade members 8, 9, 10 and 11, respectively, when they are moved to closed position as indicated in Figs. 1 and 2. Each terminal member is provided with a binding screw 21 for the purpose of attaching the various conductor terminals and jumpers to their respective terminal members.

The switch blades are moved to closed position by means of a handle 22 that extends within the housing and is provided with a bent portion which is pivoted to the sides of the housing and which extends over the free ends of the switch blade members.

The switch blade members 10 and 11 are for the purpose of controlling the circuit through the series of current coils of a meter which is usually mounted at the upper end of the box upon a frame 23 provided to support the meter and to enclose the conductors extending from the box to the meter. The switch blade members 8 and 9, which are disposed between the blade members 10 and 11, are for the purpose of controlling the load circuit.

The switch blade members 8 and 9 may be opened independently of the switch blade members 10 and 11 by means of a yoke 24 that is attached thereto and which extends over the switch blades 10 and 11. The yoke 24 is operatively connected to the handle 22 by means of a clip 25 that is secured to the yoke 24 and which is looped over the handle 22.

When the handle 22 is moved to open position, the switch blade members 8 and 9 are moved to open position, the blades 10 and 11 remaining in their original closed position. The blades 10 and 11 may subsequently be opened independently, as desired. When the blade members 8 and 9 are moved to closed position, the yoke or bar 24 engages the blade members 10 and 11, if they be open, and moves them to closed position simultaneously with the blade members 8 and 9. This arrangement insures that all of the switch blades will be returned to their normal operative position when the test is completed.

Figs. 5 and 6 diagrammatically illustrate the manner in which the switch is employed in a three-wire system, the former figure illustrating the normal service connections and the latter illustrating the connections for testing the service meter with the standard test meter.

The service meter is indicated by the current or series coils 26 and 27 and the potential or voltage coil 28. The feed conductors or buses are identified by the numerals 29, 31 and 32 and the corresponding load conductors by the numerals 29a, 31a and 32a. The meter is provided with four terminals 33, 34, 35 and 36 which are respectively connected as indicated by the terminal members 18, 17, 16 and 19 of the switch.

The switch terminals 14 and 12 are connected to the feed conductor 29 and the corresponding load conductor 29a, respectively, in such manner as to place the series coil 26 in series in the circuit through the load, and the switch terminals 15 and 13 are so connected to the feed conductor 32 and to the corresponding load conductor 32a, respectively, as to place the series coil 27 in series in the circuit through the load. The potential or voltage coil 28 of the meter is permanently connected across the conductor 29 and the switch contact 15 and is controlled by the switch member 10.

In normal service operation, the blade members 8 and 9 are used for controlling the current in the load circuits. Except when the meter is being tested, the switch members 10 and 11 remain closed regardless of the position of the blade members 8 and 9.

When it is desired to test the meter, provision must be made to insure a continuous supply of current through the load circuit while the meter is being tested. For this purpose, jumpers 37 and 38, indicated by dotted lines in Fig. 6, are placed across terminals 14 and 12 and across terminals 13 and 15, respectively, thereby shunting the circuits through the blade members 8 and 9, respectively. The jumpers are attached to their respective terminals by means of the binding screws 21.

As illustrated, means are provided for connecting the series coils 26 and 27 in the meter in series on half voltage to economize the current wasted on the test load. To accomplish this result, the jumper 39 is connected across the switch terminals 16 and 17, thereby connecting the series coils in series.

As shown in Fig. 7, the jumper 39 comprises a metal plate 52 having ears 53 extending at right angles thereto for the purpose of engaging the binding screws 21. The ears are provided with slots 54 through which the binding screws are inserted. The plate 52 is covered with insulating material 55 and extends above the jaws of the terminals 16 and 17 and serves to prevent closing movement of the switch members 8 and 9 so long as the jumper is in operative association with the terminals 16 and 17, as indicated in broken lines in Figs. 1 and 2.

It will be observed that the free ends of the switch blade members extend over the binding screws 21 of the terminals 16, 17, 18 and 19 and prevent manipulation thereof except when the blade members are in open position. By reason of this condition, it will not be possible to connect the jumper 39 and the conductor 45 to their respective terminals 16, 17 and 19 except when the switch blade members 8, 9 and 11 are in open position. Premature application of the jumper is prevented and the possibility of a short circuit is therefore avoided. It is obvious that various forms of jumpers may be devised for accomplishing the results effected by the one described and that other means may be employed for preventing closing movement of the switch blade members while the jumper is in operative position.

A standard test meter 41 is connected in the circuit by having the potential coil 42 thereof connected across the conductors 29a and 32a, the series coil 43 thereof being connected in series with the test load or variable resistor 44. The series coils 26 and 27 are connected in series with the variable resistor 44 and the series coil 43 of the test meter by means of a conductor 45 that is attached, at one end, to the switch terminal 19 by means of a binding screw 21 and, at the other end, to the movable conductor of the resistor. Before the above-mentioned jumpers and conductors are used, the blade members 8, 9 and 11 must be opened.

Current to the normal load will then pass through the conductors 29 and 32, the jumpers 37 and 38, respectively, and the load conductors 29a and 32a, respectively, without interruption. Current will also flow, at reduced voltage, through conductor 29, blade member 10, contacts 18 and 33, series coil 26, contacts 35 and 16, jumper 39, contacts 17 and 34, series coil 27, contacts 36 and 19, conductor 45, variable resistor 44, series coil 43 of the test meter to the conductor 31a. During the test, the circuit through the meter may be opened or closed, as desired, by the movement of the blade member 10. After the test has been completed, the test connections 39 and 45 are removed and the switch-operating handle is moved to the closed position, thereby simultaneously closing all of the switches. The jumpers 37 and 38 may then be removed and the circuits restored to their normal condition.

The panel 7 is provided with an integral portion adapted to support the bus conductors or bars 29, 31 and 32 that enter the lower portion of the box through the sides thereof. The bus bar or conductor 31 is connected to a terminal 46 by means of a conductor strip 47.

The box is provided with "knockouts" which normally closed the openings 49 provided in the sides of the box for the entrance of the bus bars. This arrangement permits of the banking of a plurality of meters side by side, the bus bars extending through all of the boxes. The boxes are connected by means of flanged conduit members 50 having a cross-section of U-shape that fit within the openings 49 in the sides of the boxes and enclose the conductors extending between the boxes.

Figure 4:
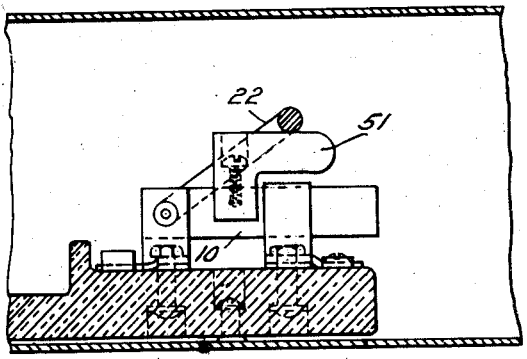
Fig. 4 is a section through the mechanism shown in Fig. 3 taken on the line IV—IV of Fig. 3.

Referring to Figs. 3 and 4, in which is illustrated a modified form of switch mechanism wherein the switch blade members 10 and 11 are each provided with insulating handles 51 which may be used by the operator to open the switch blade members and which are adapted to be directly engaged by the operating handle 22 for the purpose of moving the switch blade members 10 and 11 to closed position. In this construction, the yoke 24 does not extend over the switch blade members 10 and 11. The operation is the same as that of the switch mechanism shown in Figs. 1 and 2.

While I have described and illustrated but two embodiments of my invention, it will be apparent to those skilled in the art that various changes, modifications, substitutions, additions and omissions may be made in the apparatus illustrated without departing from the spirit and scope of the invention, as set forth in the appended claims.

I claim as my invention:—

1. The combination with a polyphase meter comprising two current coils and a service switch operatively associated therewith, of a jumper associated with the switch whereby the two current coils of the meter may be connected in series for meter testing purposes, the said jumper having means thereon for preventing energization of the service switch from its contact while the jumper is in operative association with the switch.

2. The combination with a polyphase meter comprising two current coils and a blade service switch operatively associated therewith and having contact jaws provided with conductor attaching means, of a jumper associated with the switch whereby the two current coils of the meter may be connected in series for meter testing purposes, the said switch having means extending over the attaching means for preventing operation thereof for the operative association of the jumper with the switch so long as the switch is in closed position.

3. Switch mechanism comprising two pairs of contact members, connectors for operatively connecting and disconnecting the contact members of each pair and a jumper for connecting a contact member of one pair with a contact member of the other pair and having insulating means whereby operative connection of the connectors with the contact members is prevented so long as the jumper is operatively associated with the said contact members.

4. Switch mechanism comprising two pairs of contact members having terminals, switch blade members for operatively connecting and disconnecting the contact members of each pair and a jumper adapted for operative connection to the terminal for connecting a contact member of one pair with a contact member of the other pair, the said switch members having means for preventing the operative association of the jumper with the terminals so long as the switch members are in operative engagement with the contact members.

In testimony whereof, I have hereunto subscribed my name this 11 day of Mar. 1921.

OLIVER S. JENNINGS.